United States Patent [19]

Enomoto

[11] Patent Number: 4,526,734

[45] Date of Patent: Jul. 2, 1985

[54] PROCESS FOR THE PRODUCTION OF SILICON CARBIDE SINTERED BODIES

[75] Inventor: Ryo Enomoto, Ohgaki, Japan

[73] Assignee: Ibigawa Electric Industry Co., Ltd., Japan

[21] Appl. No.: 352,477

[22] Filed: Feb. 26, 1982

[30] Foreign Application Priority Data

Mar. 5, 1981 [JP] Japan ................................. 56-30551
Mar. 5, 1981 [JP] Japan ................................. 56-30552

[51] Int. Cl.³ ............................................. C04B 35/34
[52] U.S. Cl. ......................................... 264/13; 264/28
[58] Field of Search ..................... 264/63, 65, 28, 13, 264/69, 86; 501/90

[56] References Cited

U.S. PATENT DOCUMENTS

| | | | |
|---|---|---|---|
| 2,893,102 | 7/1959 | Maxwell | 264/28 |
| 3,171,870 | 3/1965 | Monteil | 264/28 |
| 3,516,935 | 6/1970 | Monforte | 264/56 |
| 4,004,934 | 1/1977 | Prochazka | 264/65 |
| 4,041,117 | 8/1977 | Prochazka | 264/65 |

Primary Examiner—John A. Parrish
Attorney, Agent, or Firm—Parkhurst & Oliff

[57] ABSTRACT

A process for producing a silicon carbide sintered body is disclosed, which comprises the steps of charging a sintering raw material consisting mainly of silicon carbide fine powder and sintering aid into a dispersion medium together with, if necessary, at least one substance of a molding assistant and a deflocculating agent to form such a uniform suspension that a volume ratio of solid content composed of said silicon carbide fine powder and sintering aid in said suspension is not more than 15%; spray freezing said suspension in an atmosphere held at a temperature lower than a melting point of said dispersion medium to obtain a granular frozen body; freeze drying said granular frozen body for sublimation of said dispersion medium to obtain a powdery dried mixture; shaping said powdery dried mixture into a green body of an optional form; and sintering said green body without pressing.

44 Claims, 2 Drawing Figures

PROCESS FOR THE PRODUCTION OF SILICON CARBIDE SINTERED BODIES

BACKGROUND OF THE INVENTION

1. Field of the Invention

This invention relates to a process for the production of a high density and high strength silicon carbide sintered body, and more particularly to a process for producing a silicon carbide sintered body by charging a sintering raw material consisting mainly of fine silicon carbide powder and a sintering aid into a dispersion medium to form a uniform suspension, spray freezing the suspension to form a granular frozen body, freeze drying the frozen body for the sublimation of the dispersion medium to obtain a powdery or granular dried mixture, shaping the dried mixture into a green body of an optional form and then sintering the green body without using any pressing techniques.

2. Description of the Prior Art

Silicon carbide has excellent chemical and physical properties, and is suitable for high temperature structural applications used under severe conditions, such as components for gas turbines, heat exchangers at higher temperature and the like.

Heretofore, there have been widely known a hot pressing process, a reaction sintering process and the like. However in the hot pressing process it is very difficult to produce a sintered body of a complicated form and also the productivity is low. In the reaction sintering process, it is very difficult to produce a high strength sintered body and also the heat strength at elevated temperature zone deteriorates due to the presence of a great amount of free silicon.

Since silicon carbide is a material which is difficult to sinter, it has hitherto been considered that it is very difficult to apply a process usually used in the production of oxide ceramics, wherein a green article shaped at room temperature is sintered without pressing, to the sintering of silicon carbide. However, there has recently been proposed a process for sintering silicon carbide without pressing, wherein a powder mixture of silicon carbide, boron-containing additive and carbonaceous additive is shaped into a green body and then sintered in an inert atmosphere. For instance, U.S. Pat. No. 4,004,934 discloses that silicon carbide is mixed with a boron-containing additive (0.3-3.0 wt% of B) and a carbon-containing additive (0.1-1.0 wt% of C) and shaped into a green body and then the resulting green body is sintered at a temperature of 1,900°-2,100° C. in an inert atmosphere without pressing to produce a silicon carbide sintered body having a density corresponding to at least 85% of theoretical density.

In the above pressureless sintering process, the boron-containing additive and carbonaceous additive are mainly used as a sintering aid, but a beryllium- or aluminum-containing additive may further be used. The addition of the boron-containing additive as a sintering aid is due to the fact that when boron is existent in each contact point between silicon carbide particles in the sintering, a tacky layer of boron is formed on the surface of the silicon carbide particle, resulting in a uniform advance of shrinkage. While, the carbonaceous additive is mainly added for reducing a silica film, which always covers the surface of the silicon carbide particles at room temperature and obstructs the self-sintering of silicon carbide, with carbon to enhance the sinterability of silicon carbide, and for suppressing exaggerated grain growth. Therefore, it is advantageous that the aforementioned sintering aids are uniformly dispersed into the fine silicon carbide powders.

As a means for the formation of a green shaped body in the ceramic pressureless sintering process, there have hitherto been known various methods such as slurry cast molding, extrusion molding, lathe molding, rocking molding, dry pressure molding and the like. These shaping methods can be largely divided into wet method and dry method in accordance with the liquid content in the shaping. The invention is mainly concerned with a process for the production of a high density and high strength silicon carbide sintered body by the dry shaping method.

In the pressureless sintering process, it is expected to obtain a silicon carbide sintered body having a higher strength in view of properties inherent to its silicon carbide. Among the conventionally known silicon carbide sintered bodies, however, a high strength sintered body is particularly produced only by starting from very expensive β-type silicon carbide obtained by thermal decomposition of high molecular weight organosilicon compound or silicon carbide synthesized by a very special production method, because it is very difficult to industrially produce a high strength pressureless-sintered body of silicon carbide by starting from silicon carbide synthesized from silica and carbon in the usual manner.

The inventor has made various studies in order to clear up the cause of deteriorating the properties, particularly the mechanical strength of the silicon carbide pressureless-sintered body produced by using fine powders of silicon carbide synthesized from silica and carbon in the usual manner as a starting material, and as a result it has been concluded that the cause of deteriorating the properties, particularly the mechanical strength of the above pressureless-sintered body is due to the following mechanism.

That is, the sintering raw material used in the production of silicon carbide pressureless-sintered body is significant to be a fine powder of silicon carbide containing a uniformly dispersed sintering aid as previously mentioned. However, since the silicon carbide fine powder or the sintering aid is very strong in the agglomeration, it is difficult to obtain a mixture of these materials at a thoroughly uniform dispersed state without agglomerating. Therefore, a mixture of silicon carbide fine powder and sintering aid containing partly agglomerated particles has hitherto been used as a sintering raw material. As a result, when such a mixture is used to produce a silicon carbide pressureless-sintered body, the effect of the sintering aid is non-uniform in the sintering, which produces a microscopical scattering in the properties of the finally sintered body such as density, crystal grain size and the like, whereby the properties, particularly the mechanical strength of the sintered body, is considerably deteriorated.

Furthermore, since the aforementioned sintering raw material has a very fine particle size and has poor fluidity and moldability, when said raw material is shaped into a green body by the dry shaping method, it is difficult to uniformly charge into a mold under pressure, so that the scattering arises in the bulk density of the green body or the pressure distribution at the shaping, or defects due to the bridging are apt to occur in the green body. Such defects induced in the shaping remain in the sintered body after the sintering, which results in the considerable deterioration of the properties, particularly mechanical strength of the sintered body.

Now, there have hitherto been reported various method of preparing a sintering raw material composed of silicon carbide fine powder and sintering aid.

In U.S. Pat. No. 4,004,934, for instance, there is disclosed a method of preparing the sintering raw material wherein silicon carbide fine powder is dispersed into a solution of oleic acid and aluminum stearate in benzene and ball milled to yield a slurry and thereafter the resulting slurry is sieved and freeze dried to obtain a friable cake, which is then broken up and sieved. According to this method, however, a means for preventing the agglomeration is not considered at the stages after the ball milling treatment capable of giving a strong shearing force, so that a part of the silicon carbide fine powder and sintering aid is apt to be segregated by agglomeration until the freezing of the slurry. Moreover, the sintering raw material is produced by breaking up the friable cake and sieving it as mentioned above, so that the resulting granules are relatively angular resulting in a poor fluidity. As a result, it is difficult to uniformly charge these granules into a mold.

Furthermore, U.S. Pat. No. 4,041,117 discloses a method wherein a mixture of silicon carbide fine powder and sintering aid is ball milled in a solution of benzene containing polyethylene glycol to yield a slurry, which is then spray-dried. According to this method, however, a means for preventing the agglomeration is also not considered at the stages after the ball milling treatment capable of giving a strong shearing force likewise the case of U.S. Pat. No. 4,004,934, so that a part of the silicon carbide fine powder and sintering aid is segregated by selective agglomeration until the drying of the slurry, or the sintering aid is apt to be segregated with the shift of the dispersion medium in the drying. Moreover, owing to the spray drying of the slurry, the sintering raw material having a uniform particle size distribution and a round granular form can easily be produced in large quantities, but the apparent granule density becomes higher due to the shrinkage in the drying. As a result, the resulting granules are apt to be rigid, which results in the deterioration of the press moldability. The term "apparent granule density" used herein means a weight of granules per unit bulk volume, and the term "bulk volume" means a volume including a solid content occupied in the granules and an inner space.

As mentioned above, the conventionally known methods of preparing the sintering raw material have many drawbacks.

SUMMARY OF THE INVENTION

It is, therefore, an object of the invention to provide a process for producing a high strength silicon carbide sintered body by preparing a sintering raw material composed of uniformly dispersed silicon carbide fine powder and sintering aid and having an excellent moldability, shaping the sintering raw material into a green body of an optional form and sintering the green body without pressing.

According to the invention, there is the provision of a process for producing a silicon carbide sintered body comprising the steps of:

(a) charging a sintering raw material consisting mainly of silicon carbide fine powder and a sintering aid into a dispersion medium to form a uniform suspension;

(b) spray freezing the suspension in an atmosphere held at a temperature lower than a melting point of the dispersion medium to form a granular frozen body;

(c) freeze drying the granular frozen body for the sublimation of the dispersion medium to obtain a powdery or granular dried mixture;

(d) shaping the dried mixture into a green body of an optional form; and (e) sintering the green body without pressing.

DETAILED DESCRIPTION OF THE INVENTION

According to the invention, it is important that the sintering raw material is a mixture of uniformly dispersed silicon carbide fine powder and sintering aid having an excellent moldability. However, methods suitable for the preparation of such a sintering raw material have not been known at all as previously mentioned.

The inventor has made various investigations with respect to the preparation of the mixture containing uniformly dispersed silicon carbide fine powder and sintering aid and having an excellent moldability and as a result, it has been found that such a mixture can be prepared by uniformly dispersing the silicon carbide fine powder and the sintering aid in a dispersion medium, spray freezing the resulting suspension in an atmosphere held at a temperature lower than a melting point of the dispersion medium, and then freeze drying the resulting frozen body for the sublimation of the dispersion medium.

Namely, since the silicon carbide fine powder and sintering aid are powders having a very strong agglomeration tendency, it is very difficult to effectively prepare the sintering raw material having an excellent moldability at a uniform dispersion state from such powders in the conventionally known manner. According to the invention, however, the silicon carbide fine powder and the sintering aid are uniformly dispersed in the dispersion medium to form a suspension and then the resulting suspension is spray frozen as fine droplets in an atmosphere held at a temperature lower than the melting point of the dispersion medium in a very short time, whereby the agglomeration of each of the silicon carbide fine powder and sintering aid can be prevented. Then, the resulting frozen body is freeze dried to sublimate the dispersion medium therefrom, whereby the sintering raw material containing uniformly dispersed silicon carbide fine powder and sintering aid and having an excellent moldability can be obtained.

According to the invention, when the silicon carbide fine powder and sintering aid are uniformly dispersed in the dispersion medium to form a suspension, it is necessary that a volume ratio of solid content of silicon carbide fine powder and sintering aid occupied in the suspension is not more than 15%. Because, if the silicon carbide fine powder and sintering aid are not uniformly dispersed in the dispersion medium, there is produced a difference between the silicon carbide content and the sintering aid content in the sintering raw material. If such a raw material containing non-uniformly dispersed silicon carbide fine powder and sintering aid is used to produce a silicon carbide sintered body, the effect of the sintering aid becomes non-uniform, which results in the scattering of density, crystal grain size and the like in the sintered body and hence the deterioration of the properties of the sintered body. Therefore, the volume ratio of the solid content should be limited to not more than 15%, whereby a very uniform dispersion state can easily be obtained for a short period of time. Considering the purpose of obtaining a uniform suspension, it is advantageous that the volume ratio is lower if possible, but if the volume ratio is too low, the substantial treating quantity per unit equipment reduces, which is uneconomical. From this fact, it is preferable that the volume ratio is within a range of 2 to 15%.

The silicon carbide fine powder to be used in the invention is at least one silicon carbide selected from α-type crystal, β-type crystal and amorphous substance and having a specific surface area of 5 to 50 m$^2$/g and an oxygen content of 0.1 to 1.0 weight%. Particularly, the use of silicon carbide fine powder consisting mainly of β-type crystal is advantageous for the production of high strength silicon carbide sintered bodies.

The sintering aid is mainly a boron containing additive and/or a carbonaceous additive, but the other well-known additives containing beryllium, aluminum and the like may also be used as the sintering aid.

As the boron containing additive, at least one substance selected from boron, boron carbide, boron nitride, aluminum boride and boron phosphoride is advantageously used in an amount of 0.1 to 3.0 parts by weight as a boron content based on 100 parts by weight of the silicon carbide fine powder. Particularly, it is preferable to use the boron containing additive having a specific surface area of at least 10 m$^2$/g.

As the carbonaceous additive, use may be made of various organic substances, which are present as a free carbon in the beginning of the sintering, such as phenolic resin, lignin sulfonate, polyvinyl alcohol, corn starch, molasses, coal tar pitch, alginate, polyphenylene, polymethylphenylene and the like; or thermal decomposition carbons such as carbon black, acetylene black and the like. The carbonaceous additive is preferably used in an amount of 0.5 to 4.0 parts by weight as a fixed carbon content based on 100 parts by weight of the silicon carbide fine powder. Particularly, it is preferable to use the carbonaceous additive having a specific surface area of at least 50 m$^2$/g in the beginning of the sintering.

According to the invention, a molding assistant may advantageously be added to the sintering raw material. Such a molding assistant acts as a lubricant or a binder in the shaping and develops the effect of reducing the molding defects induced in the green body. For instance, as the molding assistant developing the effect of the lubricant, mention may be made of Carbowax (trade name, made by Union Carbide Corp.), magnesium stearate, barium stearate, aluminum stearate, zinc stearate, stearic acid and the like. As the molding assistant developing the effect of the binder, mention may be made of starch, dextrin, gum arabic, casein, molasses, sodium carboxymethylcellulose, methylcellulose, polyvinyl alcohol, polyvinyl methyl ether, polyacrylamide, tannic acid, liquid paraffin, wax emulsion, ethylcellulose, polyvinyl acetate, phenolic resin and the like. As the molding assistant developing the effect of both the lubricant and binder, mention may be made of cellulose acetate, glycerin, polyethylene glycol and the like. These substances may be added alone or in admixture in an amount of 2 to 20 parts by weight based on 100 parts by weight of the sintering raw material.

According to the invention, it is essential that the suspension containing the uniformly dispersed raw material is spray frozen in an atmosphere held at a temperature lower than a melting point of the dispersion medium and then the dispersion medium is sublimated from the resulting granular frozen body to obtain a powdery dried mixture. The reason why the suspension is spray frozen in the atmosphere held at the temperature lower than the melting point of the dispersion medium is due to the fact that the heat exchange can rapidly be carried out for a very short period of time by spraying the suspension in the form of fine droplets and as a result, there can easily be prevented the agglomeration and segregation of each of the silicon carbide fine powder and sintering aid, which have never been avoided in the prior art. Further, the reason why the dispersion medium is sublimated from the frozen body is due to the fact that the sintering raw material maintained at the uniformly dispersed state can easily be produced at a dried state by the freeze drying without causing the segregation of the silicon carbide fine powder and sintering aid.

In the spraying of the suspension, it is preferable that the temperature of the atmosphere is at least 5° C. lower than the melting point of the dispersion medium. If the temperature of the atmosphere is not at least 5° C. lower than the melting point of the dispersion medium, the freezing of the suspension droplets take a relatively long time, so that each of the silicon carbide fine powder and sintering aid is apt to be segregated by agglomeration in the droplet. Moreover, the lower the temperature of the atmosphere, the faster the freezing rate of the suspension droplet, but the extremely lower temperature requires a much cost for the cooling of the atmosphere. Therefore, the temperature of the atmosphere is preferably within a range of 10° to 100° C. lower than the melting point of the dispersion medium.

As the dispersion medium are used ones having a melting point of $-5°$ C. to 15° C. Among them, benzene, cyclohexane or water is preferably used. Particularly, the use of benzene is advantageous because benzene has a relatively high melting point and a freezing easiness and can dissolve ones soluble in an organic solvent, which are selected from the carbonaceous additives as a sintering aid, to uniform disperse therein. Moreover, a substance serving to raise the melting point may be added to the dispersion medium.

Since the silicon carbide fine powder and sintering aid exhibit a very strong agglomeration even in the suspension, it is very difficult to get a uniform dispersed state without agglomeration by a usual agitating means such as an impeller, a screw or the like. However, when using a dispersing means capable of giving a strong shearing force such as vibration ball mill, attritor, colloid mill, ball mill, high-speed mixer or the like, the uniform dispersed state aiming at the invention can easily be obtained for a short period of time.

Preferably, the suspension is discharged from the dispersing means while vibrating the suspension, because the vibration of the suspension not only can give a good fluidity to easily perform the discharge of the suspension in a short time but also can prevent the agglomeration and segregation of each of the silicon carbide fine powder and sintering aid in the discharging. For instance, at least one means selected from mechanical vibration, supersonic vibration and electromagnetic vibration is advantageously utilized as a means for vibrating the suspension.

The suspension after the discharge is preferably sprayed while maintaining the uniform dispersed state by a vibrating or agitating means without being continuously left to stand for more than 2 minutes. Because, the silicon carbide fine powder and sintering aid are apt to agglomerate as previously mentioned, so that when the suspension is continuously left to stand for more than 2 minutes, the agglomeration and segregation of the silicon carbide fine powder and sintering aid becomes conspicuous and the uniform dispersibility of the suspension is lost. For this end, a means for maintaining the uniform dispersed state such as supersonic vibration, electromagnetic vibration, impeller agitation, screw agitation or the like is used advantageously.

According to the invention, the suspension may contain a deflocculating agent, if necessary. In this case, the deflocculating agent serves not only to unravel the agglomeration of the silicon carbide fine powder or sintering aid in the suspension to improve the uniform dispersibility of the silicon carbide fine powder and sintering aid having different specific gravity and particle size, but also to reduce the viscosity of the suspension to facilitate the spraying thereof. When the dispersion medium is an organic medium, the deflocculating agent is at least one substance selected from organic substance containing a sulfonic group, organic substance containing a carboxyl group, amine and ester, an example of which includes polyoxyethylene fatty acid amine, sorbitan fatty acid ester, dialkylsulfosuccinic acid ester, fatty acid, alkyl amine salt and benzene sulfonic acid. Particularly, when inorganic carbon is existent as the sintering aid in the organic dispersion medium, use may be made of polyoxysorbitan fatty acid ester, polyoxyethylene glycerin fatty acid ester, polyethylene glycol fatty acid ester, pentaerythritol fatty acid ester, propylene glycol fatty acid ester, sucrose fatty acid ester, polyglycerin fatty acid ester, fatty acid alkanolamide, amine oxide and the like as the deflocculating agent.

On the other hand, when the dispersion medium is water, the deflocculating agent is at least one substance selected from amine, organic substance containing a carboxyl group, organic substance containing an ether group, organic substance containing an ammonium group, ester, aluminate, phosphorate, sulfonate and silicate, an example of which includes tetraammonium hydroxide, monoethanolamide, monoethylamine, diethylamine, triethylamine, propylamine, isobutylamine, monobutylamine, di-n-propylamine, tannic acid, sodium alginate, ammonium alginate, polyacrylic acid, polyacrylic acid amine, polyacrylic acid ester, ammonium polyacrylate, sodium lignin sulfonate, ammonium lignin sulfonate, sodium aluminate, water-glass and the like. Particularly, when the inorganic carbon is existent as the sintering aid in water, use may be made of fatty acid salt, alkylbenzenesulfonate, straight-chain alkylbenzenesulfonate, α-olefin sulfonate, sulfonate of naphthalene-formalin condensate, polyoxyethylene alkylether, polyoxyethylene alkylphenyl ether and the like as the deflocculating agent.

In any case, these substances may be used alone or in admixture as the deflocculating agent and are added to the suspension in an amount of 0.05 to 15 parts by weight per 100 parts by weight of the sintering raw material. Moreover, the uniform dispersed state may further be improved by properly adjusting pH value of the suspension with aqueous ammonia or the like.

The inventor has made further various studies with respect to the properties of the suspension containing the silicon carbide fine powder and sintering aid uniformly dispersed in the dispersion medium according to the invention and found that a best result can be obtained when the droplet of the suspension satisfies the relationship expressed by the following equation:

$$X \leq 0.8 \sqrt[3]{\frac{M-T}{Q}},$$

wherein X is an average diameter of the suspension droplet sprayed (mm), Q is a heat quantity to be taken in the freezing of the suspension per unit volume (cal/cm$^3$), M is a melting point of the dispersion medium (°C.) and T is a temperature of the atmosphere (°C.). If the average diameter of the suspension droplet exceeds the upper limit defined in the above equation, a time required for the freezing of the droplet becomes longer, which is apt to cause the agglomeration and segregation of each of the silicon carbide fine powder and sintering aid in the droplet, and also a time required for the drying is longer, which results in the decrease of production capacity per each unit of equipment.

According to another preferred embodiment of the invention, it is essential that the volume ratio of the solid content composed of the silicon carbide fine powder and sintering aid in the suspension is more than 15% in the production of the dried powder mixture by spray freezing the suspension to form a granular frozen body and then freeze drying the frozen body as apparent from the following. The apparent granule density of the dried powder mixture (i.e. dried granules) is determined by the volume ratio of the solid content in the suspension and a density is obtained approximately by subtracting a volume of the dispersion medium from a volume of the suspension. Therefore, when the volume ratio of the solid content is more than 15%, the volume of the dispersion medium included in the granular frozen body reduces to increase the apparent granule density of the dried granules, whereby contact point between the granules can be increased to obtain granules from hard to fragile in the handling after the drying but can easily be broken in the shaping. Moreover, when the volume ratio exceeds 50%, the viscosity of the suspension becomes considerably higher and it is very difficult to spray the suspension. Therefore, the volume ratio is within a range of more than 15% to 50%, preferably 20 to 45% in order to obtain the sintering raw material having excellent fluidity and moldability.

According to the invention, it is preferable that an average grain size of the granules is within a range of 0.02 to 0.5 mm. When the average grain size is smaller than 0.02 mm, the fluidity lowers considerably, which produces the scattering in the bulk density of the green body and the pressure distribution at the shaping or is apt to cause the defects due to the bridging in the green body. While, when the average grain size exceeds 0.5 mm, it is difficult to shape the granules into a green body of a small and complicated form.

Furthermore, a powder bulk density of the granules is preferably within a range of 0.4 to 1.2 g/cm$^3$, particularly 0.6 to 1.0 g/cm$^3$. When the powder bulk density is less than 0.4 g/cm$^3$, a compression ratio in the shaping becomes considerably higher and the shaping is difficult. While, when the powder bulk density exceeds 1.2 g/cm$^3$, the grain size distribution of the granules becomes relatively wider or the apparent granule density becomes higher. In the former case, the fluidity deteriorates, while in the latter case, the crushing strength of the granules is too high, so that a part of the granules remains in the green body without being crushed in the press shaping, which may produce a portion having a considerably lower density in the sintered body. Moreover, the term "powder bulk density" used herein means a weight of granules per unit volume inclusive of solid, inner and outer spaces.

As mentioned above, according to the invention, the sintering raw material having an excellent moldability can be produced at a very uniform dispersed state as compared with those produced by the methods of U.S. Pat. Nos. 4,004,934 and 4,041,117. Then, by shaping the above sintering raw material into a green body of an optional form and sintering the green body at a temperature of 1,900°–2,300° C. in an inert gas atmosphere, can be produced a silicon carbide sintered body having higher density and strength.

BRIEF DESCRIPTION OF THE DRAWINGS

The invention will now be described with reference to the accompanying drawings, wherein.

DETAILED EXPLANATION OF THE PREFERRED EMBODIMENTS

The invention will be described more clearly by means of the following examples and comparative examples.

EXAMPLE 1

Silicon carbide fine powder was prepared by refining and sieving silicon carbide produced by the process disclosed in U.S. Pat. No. 4,162,167. This silicon carbide fine powder consisted mainly of 96.2 weight% of β-type crystal, contained 0.38 weight% of free carbon and 0.18 weight% of oxygen, and had a specific surface area of 14.2 m$^2$/g.

200 g of the silicon carbide fine powder was mixed with 2.5 g of boron carbide powder having a specific surface of 21.4 m$^2$/g, which was obtained by pulverizing and sieving commercially available 200 mesh boron carbide particles as a sintering aid, and 7.76 g of novolak-type phenolic resin having a fixed carbon content of 51.6 weight%, to which were added 560 ml of benzene, 2 g of polyethylene glycol and 0.5 g of sorbitan fatty acid ester. The resulting mixture was subjected to a dispersing treatment using a vibration ball mill for 6 hours to form such a suspension that a volume ratio of solid content composed of the silicon carbide fine powder and sintering aid in the suspension was 10%. Then, the suspension was discharged from the vibration ball mill while continuing the working of the ball mill, and a part of benzene was removed by evaporation with stirring to obtain such a concentrated suspension that the volume ratio of the solid content was 37.5%. Thereafter, the concentrated suspension was again charged into the vibration ball mill, subjected to the dispersing treatment for 6 hours therein, discharged therefrom while continuing the working of the ball mill and spray frozen in a container held at −50° C. to obtain a granular frozen body. The time required from the discharging of the suspension to the spraying thereof was about 10 seconds. The thus obtained granular frozen body had an average grain size of 0.10 mm.

Then, the granular frozen body was charged into a container held at a temperature of 0° to −5° C. under a pressure of 0.01–20 mmHg to effect the freeze drying. The thus obtained dried granules had a powder bulk density of 0.83 g/cm$^3$.

A proper amount of these granules was weighed from the container, temporarily shaped in a metal die under a pressure of 0.15 t/cm$^2$ and then shaped into a green body by means of an isostatic pressing machine under a pressure of 2.0 t/cm$^2$. The green body had a density of 1.86 g/cm$^3$.

The green body was placed in a Tammann sintering furnace and sintered in an argon gas atmosphere under such a condition that the temperature was raised from room temperature to 1,650° C. at a rate of 5° C./min, maintained at 1,650° C. for 45 minutes, raised to 2,100° C. at a rate of 5° C./min and then maintained at this highest temperature for 30 minutes.

Figure 1:
FIG. 1 is a scanning-type electron photomicrograph (3,000×magnification) of a sintered body obtained in Example 1 as mentioned below.

The thus obtained sintered body had a density of 3.15 g/cm$^3$. The sintered body was worked into a test piece of 3×3×30 mm and finally abrasive-finished with diamond abrasive grains having a grain size of 1 μm, which was subjected to a three-point bending test under such conditions that a span length was 20 mm and a cross head speed was 0.5 mm/min, whereby the sintered body was confirmed to have an average strength at room temperature of 66.2 kg/mm$^2$. As shown in the scanning-type electron photomicrograph of FIG. 1, defects such as segregation of the sintering aid, presence of large pores and the like were not observed in the rupture cross-section of this test piece.

EXAMPLE 2, COMPARATIVE EXAMPLE 1

Various concentrated suspensions, as shown in the following Table 1, were prepared by changing the concentrating conditions with respect to the same mixture as used in Example 1, from which were produced various sintered bodies in the same manner as described in Example 1. The obtained results are also shown in Table 1.

TABLE 1

| | Volume ratio of solid content in suspension (%) | Properties of granule | | Density of green body (g/cm$^3$) | Density of sintered body (g/cm$^3$) | Strength of sintered body (kg/mm$^2$) |
| --- | --- | --- | --- | --- | --- | --- |
| | | average grain size (mm) | powder bulk density (g/cm$^3$) | | | |
| Example 1 | 37.5 | 0.10 | 0.83 | 1.86 | 3.15 | 66.2 |
| Example 2-1 | 20.0 | 0.09 | 0.52 | 1.83 | 3.14 | 64.5 |
| Example 2-2 | 50.0 | 0.13 | 1.04 | 1.88 | 3.16 | 68.8 |
| Comparative Example 1 | 55.0 | — | — | — | — | — |

As apparent from Table 1, the suspension of Comparative Example 1 was too high in the viscosity and was hardly sprayed.

EXAMPLE 3

The same procedure as described in Example 1 was repeated without the concentration of the suspension to obtain a granular frozen body having an average grain size of 0.06 mm, which was freeze dried to obtain a dried mixture.

A proper amount of the dired mixture was worked into granules having an average grain size of 0.12 mm and a powder bulk density of 1.1 g/cm$^3$ by a tablet method which were sintered in the same manner as described in Example 1 to obtain a sintered body. The thus obtained sintered body had a density of 3.15 g/cm$^3$ and an average strength at room temperature of 67.6 kg/mm$^2$ as measured by the three-point bending test.

EXAMPLE 4

The same procedure as described in Example 3 was repeated, except that the amount of benzene added was changed as shown in the following Table 2, to obtain a sintered body having properties shown in Table 2.

TABLE 2

|  | Amount of benzene (ml) | Volume ratio of Solid content in suspension (%) | Properties of granule | | Density of green body (g/cm$^3$) | Density of sintered body (g/cm$^3$) | Strength of sintered body (kg/mm$^2$) |
| --- | --- | --- | --- | --- | --- | --- | --- |
|  |  |  | average grain size (mm) | powder bulk density (g/cm$^3$) |  |  |  |
| Example 3 | 560 | 10 | 0.12 | 1.1 | 1.86 | 3.15 | 67.6 |
| Example 4-1 | 2,000 | 3 | 0.11 | 1.0 | 1.84 | 3.15 | 68.7 |
| Example 4-2 | 360 | 15 | 0.12 | 1.1 | 1.85 | 3.14 | 66.3 |

EXAMPLE 5

The same concentrated suspension as used in Example 1 was discharged from the vibration ball mill and stored in a storage tank, and thereafter the dried granules were prepared in the same manner as described in Example 1. In this case, the storing time in the storage tank was about 15 minutes, during which the uniform dispersed state was maintained by means of a supersonic vibration of 26 KHz and 600 W.

The thus obtained granules had an average grain size of 0.10 mm and a powder bulk density of 0.85 g/cm$^3$.

A proper amount of the granules was sintered in the same manner as described in Example 1 to obtain a sintered body.

The thus obtained sintered body had a density of 3.14 g/cm$^3$ and an average strength at room temperature of 64.4 kg/mm$^2$ as measured by the three-point bending test.

COMPARATIVE EXAMPLE 2

The same procedure as described in Example 5 was repeated, except that the suspension was left to stand in the storage tank for 150 seconds, during which a part of powders was observed to agglomerate and precipitate in the suspension. After the suspension was subjected to a dispersing treatment by supersonic vibration of 26 KHz and 600 W and impeller agitation for 1 hour, the same procedure as described in Example 1 was repeated to obtain dried granules.

The thus obtained granules had an average grain size of 0.09 mm and a powder bulk density of 0.84 g/cm$^3$.

A proper amount of these granules was sintered in the same manner as described in Example 1 to obtain a sintered body.

Figure 2:
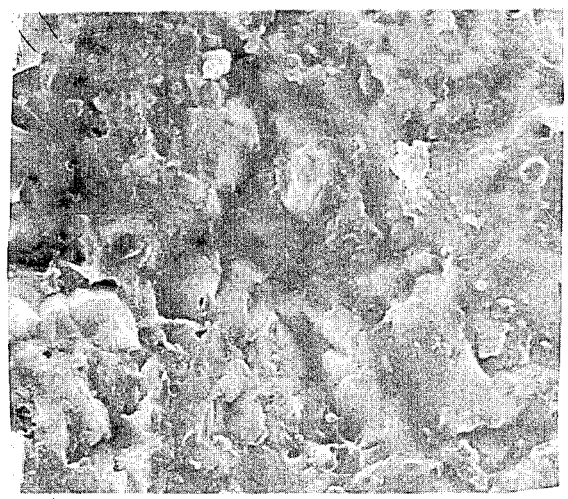
FIG. 2 is a scanning-type electron photomicrograph (3,000×magnification) of a sintered body obtained in Comparative Example 2 as mentioned below.

The density of the thus obtained sintered body was 3.09 g/cm$^3$, which showed that the sintering shrinkage was somewhat insufficient. Furthermore, the average strength at room temperature of the sintered body lowered to 41.3 kg/mm$^2$ as measured by the three-point bending test. As shown in the scanning-type electron photomicrograph of FIG. 2, the presence of inclusions due to the segregation of the sintering aid was observed in the rupture cross-section of the test piece.

EXAMPLE 6

To 100 g of the same dried mixture as described in Example 3 was added 60 ml of water to form such a suspension that the volume ratio of solid content was 34%. The suspension was subjected to a dispersing treatment in a vibration ball mill for 6 hours, discharged therefrom while continuing the working of the ball mill and spray frozen in a container held at −80° C. to obtain a granular frozen body. Moreover, supersonic vibration was applied to a pipe for transferring the suspension to a spraying nozzle. The granular frozen body had an average grain size of 0.12 mm.

Then, the granular frozen body was freeze dried in a container held at a temperature of −5° C. to −10° C. under a pressure of 0.01 to 20 mmHg to obtain dried granules having an average grain size of 0.12 mm and a powder bulk density of 0.70 g/cm$^3$.

A proper amount of these dried granules were sintered in the same manner as described in Example 1 to obtain a sintered body.

The thus obtained sintered body had a density of 3.16 g/cm$^3$ and an average strength at room temperature of 71.6 kg/mm$^2$ as measured by the three-point bending test.

EXAMPLE 7

Silicon carbide fine powder was prepared by pulverizing, refining and sieving commercially available α-type silicon carbide powder (GC #6000, made by Showa Denko Co., Ltd.). The silicon carbide fine powder contained 0.42 weight% of free carbon and 0.14 weight% of oxygen and had a specific surface area of 15.4 m$^2$/g.

200 g of the silicon carbide fine powder was mixed with 2.5 g of the same boron carbide powder as used in Example 1 and 4.0 g of carbon black having an average grain size of 210 Å and a specific surface area of 123 m$^2$/g, to which were added 560 ml of water, 2.0 g of cellulose acetate and 0.6 g of monoethanolamine. The resulting mixture was subjected to a dispersing treatment in a ball mill for 36 hours to form such a suspension that a volume ratio of solid content composed of the silicon carbide fine powder and sintering aid in the suspension was 10%. After the dispersing treatment, the suspension was discharged while applying electromagnetic vibration to the ball mill, and spray frozen in a container held at −60° C. to obtain a granular frozen body. In this case, a supersonic generator was arranged in a pipe for transferring the suspension to a spraying nozzle, whereby supersonic vibration was given to the suspension. The thus obtained granular frozen body had an average grain size of 0.14 mm.

The granular frozen body was charged into a container held at a temperature of −5° C. to −10° C. under a pressure of 0.01 to 20 mmHg to effect the freeze drying.

To 100 g of the thus obtained dried granules was added 70 ml of water to form such a suspension that the volume ratio of the solid content was 31%. The suspension was subjected to a dispersing treatment in a vibration ball mill for 6 hours, discharged therefrom while continuing the working of the ball mill, and spray frozen in a container held at −60° C. to obtain a granular frozen body. In this case, supersonic vibration was given to the suspension in the pipe for transferring to the spraying nozzle. The thus obtained granular frozen body had an average grain size of 0.11 mm.

Then, the granular frozen body was freeze dried in a container held at a temperature of −5° C. to −10° C. under a pressure of 0.01 to 20 mmHg to obtain dried granules having an average grain size of 0.11 mm and a powder bulk density of 0.68 g/cm$^3$.

A proper amount of these dried granules was sintered in the same manner as described in Example 1 except that the highest sintering temperature was 2,150° C.

The thus obtained sintered body had a density of 3.13 g/cm$^3$ and an average strength at room temperature of 56.0 kg/mm$^2$ as measured by the three-point bending test.

According to the invention, the sintering raw material having a very excellent moldability and consisting of uniformly dispersed silicon carbide fine powder and sintering aid can easily be produced in a short period of time and also a high strength silicon carbide sintered body can be produced by using such a sintering raw material without causing microscopic scattering of the properties such as density, crystal grain size and the like as well as defects of the sintered body.

What is claimed is:

1. A process for producing a silicon carbide sintered body comprising the steps of:
    (a) charging a sintering raw material consisting essentially of a substantially non-soluble silicon carbide fine powder and a sintering aid into a dispersion medium selected from the group consisting of benzene, cyclohexane and water, together with a substance selected from a group consisting of a molding assistant and a deflocculating agent to form a uniform suspension such that a volume ratio of solid content composed of said silicon carbide fine powder and sintering aid in said suspension is not more than 15%;
    (b) spray freezing said suspension in an atmosphere held at a temperature lower than a melting temperature of said dispersion medium to obtain frozen granulates;
    (c) freeze drying said frozen granulates for sublimation of said dispersion medium to obtain a powdery dried mixture;
    (d) shaping said powdery dried mixture into a green body of an optical form; and
    (e) sintering said green body without pressing.

2. A process according to claim 1, wherein said atmosphere is held at a temperature of at least 5° C. lower than said melting temperature of the dispersion medium.

3. A process according to claim 2, wherein said temperature of the atmosphere is within a range of 10° to 100° C. lower than said melting temperature of the dispersion medium.

4. A process according to claim 1, wherein said dispersion medium has a melting point of −5° C. to 15° C.

5. A process according to claim 1, wherein said suspension is maintained in a uniform dispersed state by a means selected from the group consisting of vibration means and agitation means and said means continuously function until at least two minutes prior to spray freezing said suspension.

6. A process for producing a silicon carbide sintered body comprising the steps of:
    (a) charging a sintering raw material consisting essentially of a substantially non-soluble silicon carbide fine powder and a sintering aid into a dispersion medium selected from the group consisting of benzene, cyclohexane and water, together with a substance selected from a group consisting of a molding assistant and a deflocculating agent to form a uniform suspension such that a volume ratio of solid content composed of said silicon carbide fine powder and sintering aid in said suspension is more than 15%;
    (b) spray freezing said suspension in an atmosphere held at a temperature lower than a melting temperature of said dispersion medium to obtain frozen granulates;
    (c) freeze drying said frozen granulates for sublimation of said dispersion medium to obtain a powdery dried mixture;
    (d) shaping said powdery dried mixture into a green body of an optional form; and
    (e) sintering said green body without pressing.

7. A process according to claim 6, wherein said suspension is concentrated by evaporation while maintaining the uniform dispersed state by at least one means of vibration and agitation.

8. A process according to claim 6 or 7, wherein said volume ratio of solid content in the spray freezing of said suspension is more than 15% but not more than 50%.

9. A process according to claim 8, wherein said volume ratio of solid content is within a range of 20 to 45%.

10. A process according to claim 6, wherein said dispersion medium has a melting point within a range of −5° C. to 15° C.

11. A process according to claim 6, wherein said atmosphere is held at a temperature of at least 5° C. lower than said melting temperature of the dispersion medium.

12. A process according to claim 11, wherein said temperature of the atmosphere is within a range of 10° to 100° C. lower than said melting temperature of the dispersion medium.

13. A process according to claim 6, wherein said suspension is maintained in a uniform dispersed state by a means selected from the group consisting of vibration means and agitation means and said means continuously function until at least two minutes prior to spray freezing said suspension.

14. A process according to claim 6, wherein said powdery dried mixture has an average grain size of 0.02 to 0.5 mm.

15. A process according to claim 6, wherein said powdery dried mixture has a powder bulk density of 0.4 to 1.2 g/cm$^3$.

16. A process according to claim 15, wherein said powder bulk density is 0.6 to 1.0 g/cm$^3$.

17. A process for producing a silicon carbide sintered body comprising the steps of:
   (a) charging a sintering raw material consisting essentially of a substantially non-soluble silicon carbide fine powder and a sintering aid into a dispersion medium selected from the group consisting of benzene, cyclohexane and water, to form a uniform suspension such that a volume ratio of solid content composed of said silicon carbide fine powder and sintering aid in said suspension is not more than 15%;
   (b) spray freezing said suspension in an atmosphere held at a temperature lower than a melting temperature of said dispersion medium to obtain frozen granulates;
   (c) freeze drying said frozen granulates for sublimation of said dispersion medium to obtain a powdery dried mixture;
   (d) shaping said powdery dried mixture into a green body of an optional form; and
   (e) sintering said green body without pressing.

18. A process according to claim 17, wherein a substance selected from a group consisting of a molding assistant and a deflocculating agent are added to said dispersion medium.

19. A process according to claim 17, wherein a molding assistant and a deflocculating agent are both added to the dispersion medium.

20. A process according to claim 17, wherein said atmosphere is held at a temperature of at least 5° C. lower than said melting temperature of the dispersion medium.

21. A process according to claim 20, wherein said temperature of the atmosphere is within a range of 10° C. to 100° C. lower than said melting temperature of the dispersion medium.

22. A process according to claim 17, wherein said dispersion medium has a melting point of −5° C. to 15° C.

23. A process according to claim 17, wherein said suspension is maintained in a uniform dispersed state by a means selected from the group consisting of vibration means and agitation means and said means continuously function until at least two minutes prior to spray freezing said suspension.

24. A process for producing a silicon carbide sintered body comprising the steps of:
   (a) charging a sintering raw material consisting essentially of a substantially non-soluble silicon carbide fine powder and a sintering aid into a dispersion medium selected from the group consisting of benzene, cyclohexane and water, together with a molding assistant and a deflocculating agent to form a uniform suspension such that a volume ratio of solid content composed of said silicon carbide fine powder and sintering aid in said suspension is not more than 15%;
   (b) spray freezing said suspension in an atmosphere held at a temperature lower than a melting temperature of said dispersion medium to obtain frozen granulates;
   (c) freeze drying said frozen granulates for sublimation of said dispersion medium to obtain a powdery dried mixture;
   (d) shaping said powdery dried mixture into a green body of an optional form; and
   (e) sintering said green body without pressing.

25. A process for producing a silicon carbide sintered body comprising the steps of:
   (a) charging a sintering raw material consisting essentially of a substantially non-soluble silicon carbide fine powder and a sintering aid into a dispersion medium selected from the group consisting of benzene, cyclohexane and water to form a uniform suspension such that a volume ratio of solid content composed of said silicon carbide fine powder and sintering aid in said suspension is more than 15%;
   (b) spray freezing said suspension in an atmosphere held at a temperature lower than a melting temperature of said dispersion medium to obtain frozen granulates;
   (c) freeze drying said frozen granulates for sublimation of said dispersion medium to obtain a powdery dried mixture;
   (d) shaping said powdery dried mixture into a green body of an optional form; and
   (e) sintering said green body without pressing.

26. A process according to claim 25, wherein a substance selected from a group consisting of a molding assistant and a deflocculating agent are added to the dispersion medium.

27. A process according to claim 25, wherein a molding assistant and a deflocculating agent are both added to the dispersion medium.

28. A process according to claim 25, wherein said suspension is concentrated by evaporation while maintaining the uniformed dispersed state by at least one means selected from the group consisting of vibration means and agitation means.

29. A process according to claim 25, wherein said volume ratio of solid content in the spray freezing of said suspension is more than 15% but not more than 50%.

30. A process according to claim 28, wherein said volume ratio of solid content in the spray freezing of said suspension is more than 15% but not more than 50%.

31. A process according to claim 29, wherein said volume ratio of solid content is within a range of 20% to 45%.

32. A process according to claim 30, wherein said volume ratio of solid content is within a range of 20% to 45%.

33. A process according to claim 25, wherein said dispersion medium has a melting point within a range of −5° C. to 15° C.

34. A process according to claim 25, wherein said atmosphere is held at a temperature of at least 5° C. lower than said melting temperature of the dispersion medium.

35. A process according to claim 34, wherein said temperature of the atmosphere is within a range of 10° C. to 100° C. lower than said melting temperature of the dispersion medium.

36. A process according to claim 25, wherein said suspension is maintained in a uniform dispersed state by a means selected from the group consisting of vibration means and agitation means and said means continuously function until at least two minutes prior to spray freezing said suspension.

37. A process according to claim 25, wherein said powdery dried mixture has an average grain size of 0.02 to 0.5 mm.

38. A process according to claim 25, wherein said powdery dried mixture has a powder bulk density of 0.4 to 1.2 g/cm³.

39. A process according to claim 38, wherein said powder bulk density is 0.6 to 1.0 g/cm³.

40. A process for producing a silicon carbide sintered body comprising the steps of:
(a) charging a sintering raw material consisting essentially of a substantially non-soluble silicon carbide fine powder and a sintering aid into a dispersion medium selected from the group consisting of benzene, cyclohexane and water, together with a molding assistant and a deflocculating agent to form a uniform suspension such that a volume ratio of solid content composed of said silicon carbide fine powder and sintering aid in said suspension is more than 15%;
(b) spray freezing said suspension in an atmosphere held at a temperature lower than a melting temperature of said dispersion medium to obtain frozen granulates;
(c) freeze drying said frozen granulates for sublimation of said dispersion medium to obtain a powdery dried mixture;
(d) shaping said powdery dried mixture into a green body of an optional form; and
(e) sintering said green body without pressing.

41. A process according to claim 1, wherein said suspension is spray frozen in the form of droplets satisfying a relationship expressed by the following equation:

$$X \leq 0.8 \sqrt[3]{\frac{M-T}{Q}}$$

wherein X is an average diameter of said droplet sprayed (mm), Q is a heat quantity to be taken in the freezing of the suspension per unit volume (cal/cm³), M is a melting point of the dispersion medium (°C.) and T is a temperature of the atmosphere (°C.).

42. A process according to claim 6, wherein said suspension is spray frozen in the form of droplets satisfying a relationship expressed by the following equation:

$$X \leq 0.8 \sqrt[3]{\frac{M-T}{Q}}$$

wherein X is an average diameter of said droplet sprayed (mm), Q is a heat quantity to be taken in the freezing of the suspension per unit volume (cal/cm³), M is a melting point of the dispersion medium (°C.) and T is a temperature of the atmosphere (°C.).

43. A process according to claim 17, wherein said suspension is spray frozen in the form of droplets satisfying a relationship expressed by the following equation:

$$X \leq 0.8 \sqrt[3]{\frac{M-T}{Q}}$$

wherein X is an average diameter of said droplet sprayed (mm), Q is a heat quantity to be taken in the freezing of the suspension per unit volume (cal/cm³), M is a melting point of the dispersion medium (°C.) and T is a temperature of the atmosphere (°C.).

44. A process according to claim 25, wherein said suspension is spray frozen in the form of droplets satisfying a relationship expressed by the following equation:

$$X \leq 0.8 \sqrt[3]{\frac{M-T}{Q}}$$

wherein X is an average diameter of said droplet sprayed (mm), Q is a heat quantity to be taken in the freezing of the suspension per unit volume (cal/cm³), M is a melting point of the dispersion medium (°C.) and T is a temperature of the atmosphere (°C.).

* * * * *